UNITED STATES PATENT OFFICE.

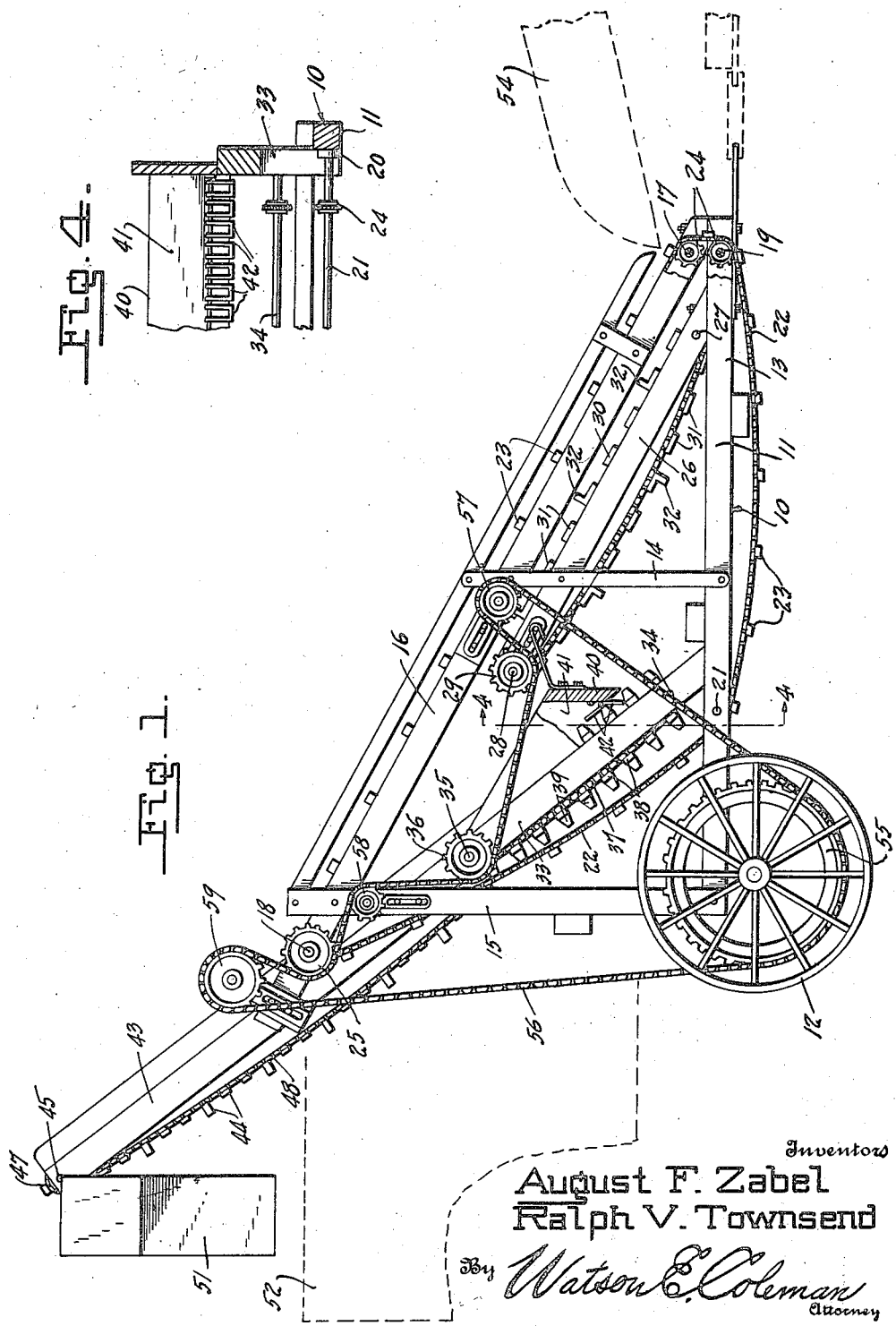

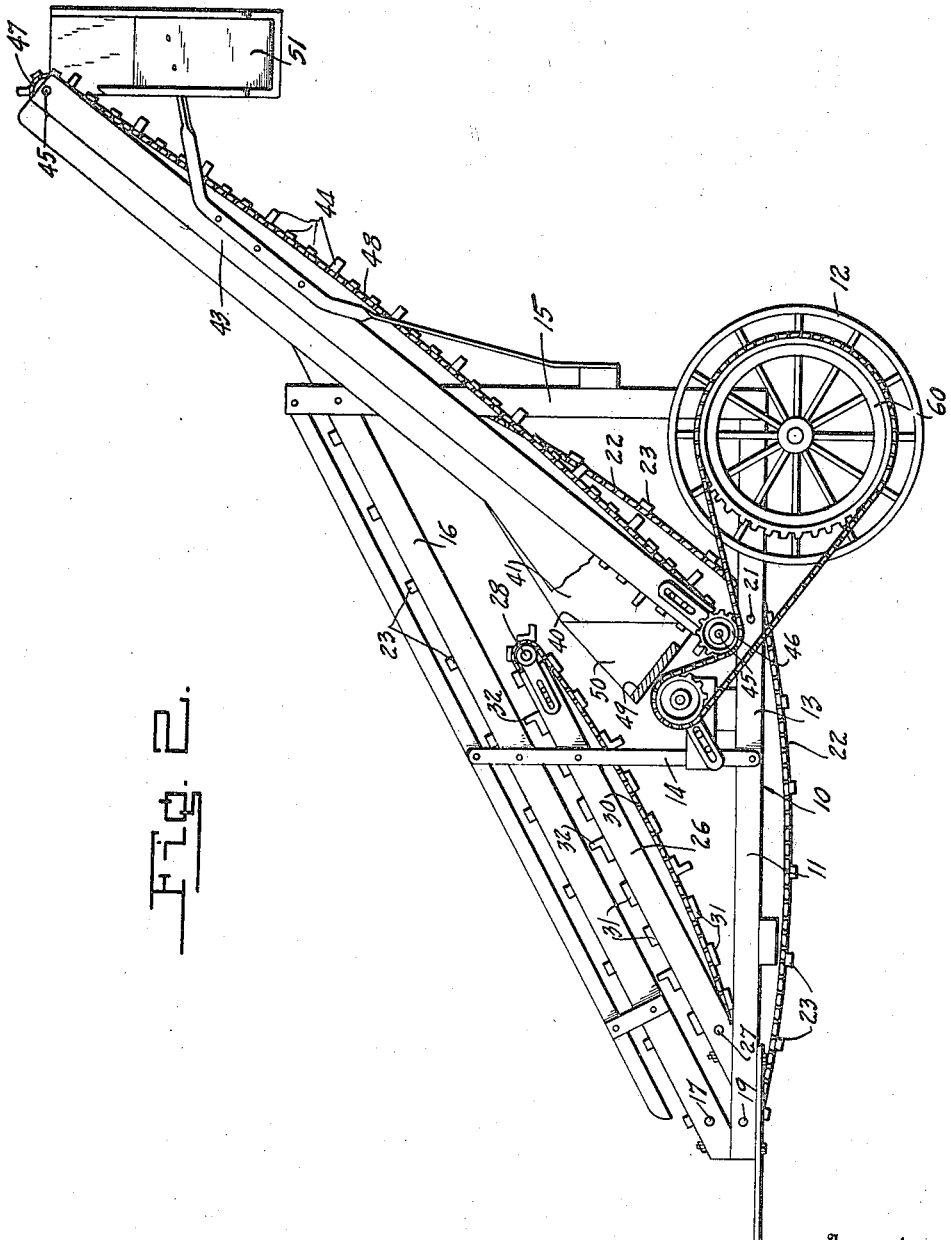

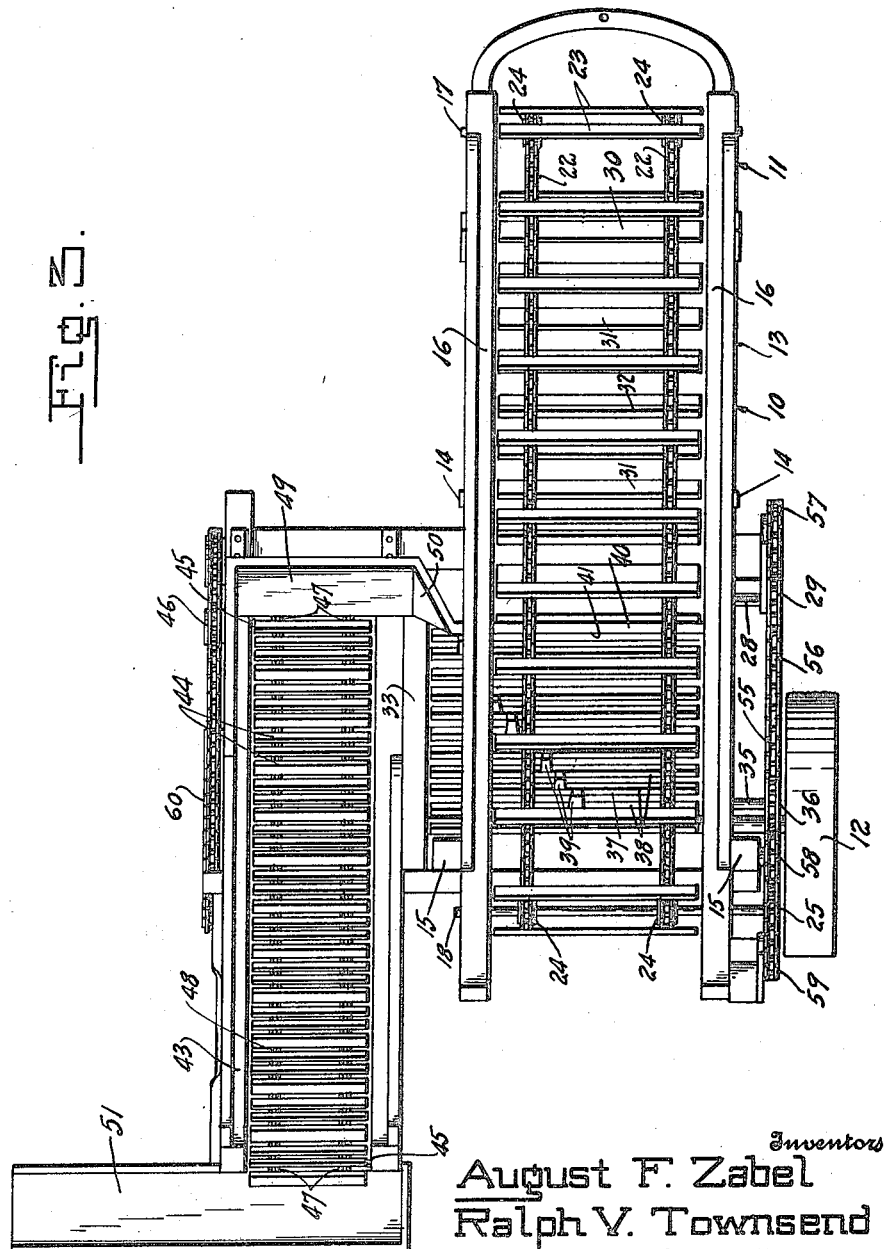

AUGUST F. ZABEL AND RALPH V. TOWNSEND, OF MINNESOTA LAKE, MINNESOTA.

POTATO PICKER.

1,424,868.  Specification of Letters Patent.  Patented Aug. 8, 1922.

Application filed April 22, 1922. Serial No. 556,022.

*To all whom it may concern:*

Be it known that we, AUGUST F. ZABEL and RALPH V. TOWNSEND, citizens of the United States, residing at Minnesota Lake, in the county of Faribault and State of Minnesota, have invented certain new and useful Improvements in Potato Pickers, of which the following is a specification, reference being had to the accompanying drawings.

This invention relates to improvements in potato pickers, and more particularly to a machine of this type adapted to receive the potatoes, vines, grass and the like discharged from a potato digger and separate the potatoes therefrom.

An important object of the invention is to provide in a device of this character means not only for separating the potatoes from the grass but for cleaning the potatoes and loading them in a barge or the like.

A further object of the invention is to provide in a device of this character a novel and improved construction of cleaning device.

A still further object of the invention is to provide in a device of this character a cleaning device whereby the potatoes are not only cleaned but fed to a discharge opening automatically as they are cleaned.

An additional object of the invention is to provide a device of this character which is simple in its construction and operation, durable in service, and a general improvement in the art.

These and other objects we attain by the construction and arrangement shown in the accompanying drawings wherein for the purpose of illustration is shown a preferred embodiment of our invention and wherein like reference characters designate like parts throughout.

In the drawings:

Figure 1 is a side elevation of a potato picker constructed in accordance with our invention;

Figure 2 is a side elevation of the opposite side of the machine;

Figure 3 is a plan view thereof; and

Figure 4 is a detail view showing the manner of mounting the valves protecting the potato bin of the cleaning attachment.

Referring now more particularly to the drawings, the numeral 10 indicates a wheel supported frame provided at one side thereof with a forward extension 11 and having the supporting wheels 12 thereof arranged adjacent the rear end of the frame. The forward extension 11 embodies side members 13 having secured thereto approximately centrally thereof a pair of upwardly extending center braces 14, and at their rear ends a pair of upwardly extending braces 15.

The numeral 16 indicates vine conveyor frame side members secured to the braces 14 and 15 at the upper ends of the braces and having their lower or forward ends secured to the forward ends of the side members 13 of the forward extension 11. Adjacent their ends the side members 16 have mounted therein ends of shafts 17 and 18. Beneath the shaft 17 which is disposed at the lower ends of the members, a shaft 19 is disposed having its ends rotatably mounted in the side members of the forward extension. Adjacent the rear ends of the side members, the side members have secured thereto adjustable bearings 20 in which is rotatably mounted a shaft 21. A conveyor comprising a pair of spaced chains 22 having secured thereto at spaced intervals cross bars or slats 23 passes about the shafts 17, 18, 19 and 21, the chains 22 thereof engaging sprockets 24 carried by these shafts. The shaft 18, or the uppermost shaft of the side members, is provided at an end thereof with a drive sprocket 25 driven in the manner hereinafter set forth.

Secured to the braces 14 adjacent the upper ends and to the side members 13 adjacent their lower ends are the side members 26 of the potato conveyor. These side members have rotatably mounted therein at their lower ends a shaft 27 and at the upper ends a shaft 28, the latter shaft being provided with a drive sprocket 29. These shafts when rotated drive a conveyor 30 having cross bars 31 arranged sufficiently closely together to prevent the passage therethrough of potatoes but permitting the passage of small stones and particles of dirt. At spaced intervals certain of the cross bars 31 are provided with upstanding flanges 32 to prevent potatoes from rolling down the incline of the conveyor. A cleaning conveyor has the side members 33 thereof secured at their upper ends to the braces 14 beneath the side members 16 of the vine conveyor and at their lower ends to the side members 13 of the extension 11. A shaft 34 has its ends rotatably mounted in the side members 33 adjacent the lower ends thereof, and a shaft 35 provided at an end with a drive sprocket 36 is rotatably mounted in the side members adjacent the upper end thereof. About these shafts passes a conveyor belt 37 driven by the shafts and comprising slightly spaced cross slats 38, each of which has secured thereto an abutment member or wormer 39. The wormers of these slats are arranged on the slat so that they are arranged in the completed conveyor flight in diagonal lines, the lower ends of the lines of the wormers being arranged at a common side of the conveyor. Attention is directed to the fact that the conveyor belt 37 is of greater width than the potato conveyor, and has this excess width disposed at one side of the potato conveyor.

Supported by the side members 26 of the potato conveyor is a lip board 40 having its lower extremity disposed adjacent the upper flight of the conveyor 37 but spaced therefrom a sufficient distance to permit passage of the abutment members or wormers 39. Pivotally secured to the inner face of the lip board, or that face thereof which combines with the conveyor 37 to form a bin or receptacle 41, are valve members 42 which may be moved or swung by the abutment members in passing to permit passage of the abutment members but which when released from the abutment members fall back into position to close the aperture provided for the passage of the abutment members and prevent escape therethrough of potatoes discharged into the bin 41 by the upper end of the potato conveyor.

Secured to the frame 10 at the side thereof at which the lower ends of the inclined rows of abutment members are disposed is an upwardly inclined conveyor frame 43 in which is mounted a conveyor 44 embodying upper and lower shafts 45, the lower shaft being provided with a drive sprocket 46 and both shafts being provided with chain sprockets 47 about which the chain belts 48 of the conveyor pass. The transverse members secured to these chain belts are sufficiently close together to prevent the passage therethrough of potatoes. Adjacent its lower end the frame has secured thereto a hopper 49 connected with the lip board 40 by an inclined chute board 50 to receive the clean potatoes discharged from the cleaning conveyor and direct them into the hopper 49. From the hopper 49 the potatoes are taken by the conveyor and discharged into a chute 51 arranged at a sufficient height to have its discharge end above the level of a barge 52 for receiving the potatoes.

In the use of my device the same is secured to the rear of the potato digger in such a manner that the discharge chute 54 of the potato digger discharges upon the vine conveyor. The vines, grasses, potatoes and other foliage passing from this discharge chute fall upon the vine conveyor and the potatoes pass through the vine conveyor because of the open construction thereof and fall upon the potato conveyor 30 where they are moved upwardly and discharged from the upper end thereof into the bin 41. In this bin 41 the potatoes are engaged by the abutment members and moved to one side of the cleaning conveyor 37 and at the same time the engagement of the abutment members therewith tends to knock any clinging dirt therefrom. Furthermore, these abutment members act to remove any particles of grass or the like which may have passed through the vine conveyor to the potato conveyor as these substances will not have a tendency to roll and will accordingly be carried by the abutment members upwardly over the upper end of the cleaning conveyor 37 and discharged to the ground. The potatoes are moved to the side of the abutment members, as hereinbefore stated, and pass over the chute board 50 into the hopper 49 where they are carried upwardly by the discharge conveyor and deposited in the inclined discharge chute and finally discharged into the barge. The vines passing upwardly on the vine conveyor will be discharged from the rear or upper end thereof and fall to the ground.

The vine, potato and cleaning conveyors are preferably all driven by one wheel of the vehicle, which wheel is provided with a drive sprocket 55 about which passes a sprocket chain 56 passing about the sprockets 29, 36 and 25 to drive each of these sprockets. Intermediate the sprockets 29 and 36 an idler sprocket 57 mounted upon the corresponding side member 16 of the vine conveyor is provided. Intermediate the sprockets 36 and 25 and intermediate the sprocket 25 and the drive sprocket 55 idler sprockets 58 and 59 are provided for tightening the chain. The other supporting wheel 12 has secured thereto a drive sprocket 60 engaging and driving the sprocket 46 of the discharge conveyor.

From the foregoing it is believed to be obvious that a potato picker constructed in accordance with our invention is particularly well adapted for the purpose for which it is intended for the reason that means are provided for thoroughly separating from the potatoes any dirt and foliage which may cling thereto and for the reason that means are provided for discharging the clean potatoes into a barge eliminating the necessity of collecting the potatoes from the flight after the cleaning. It will furthermore be obvious that the construction as hereinbefore set forth is capable of some change and modification without materially departing from the spirit of our invention and we accordingly do not limit ourselves thereto except as hereinafter claimed.

We claim:

1. In a potato picker, a cleaning apparatus comprising an inclined conveyor, means for feeding the potatoes thereto, and means carried by the conveyor for engaging the potatoes and worming the same to one side of the conveyor.

2. In a potato picker, a cleaning apparatus comprising an inclined conveyor, a potato bin disposed above the conveyor and feeding potatoes thereto, and means carried by the conveyor engaging the potatoes and worming the same to one side of the conveyor, said bin embodying pivoted sections engaged by and yielding under the pressure of said means to permit the passage thereof for engagement with the potatoes, said means normally extending into proximity to the surface of the conveyor to prevent escape of the potatoes between the lower edge of the bin and the conveyor.

3. In a potato picker, a cleaning apparatus comprising an inclined conveyor, inclined rows of abutment members carried by the conveyor, a bin disposed above the conveyor, links pivoted to the bin and swingable in the direction of movement of the adjacent flight of the conveyor and disposed in the path of said abutment members.

4. In a potato picker, a cleaning apparatus comprising an inclined conveyor, inclined rows of abutment members carried by the conveyor, a discharge chute, a second conveyor discharging into the discharge chute, a bin disposed above the first named conveyor and adapted to feed potatoes thereto for engagement by the abutment members, and a discharge chute leading from the first to the second named conveyor, said abutment members engaging potatoes disposed within the bin and worming the same transversely of the first named conveyor to the discharge chute leading to the second named conveyor.

5. In a potato picker, a vine conveyor adapted to receive potatoes, vines and other foliage from the discharge chute of a potato digger and embodying spaced slats through which the potatoes may be passed, a potato conveyor disposed beneath the vine conveyor and receiving the potatoes passing therethrough, cleaning apparatus disposed beneath the potato conveyor and embodying a bin into which the potato conveyor discharges, said cleaning apparatus embodying a conveyor of greater width than said potato conveyor and having the excess width thereof disposed at one side of the potator conveyor, a discharge chute disposed at the last named side of the cleaning apparatus, and means embodied in the cleaning apparatus for moving the potatoes transversely thereof to said discharge chute.

6. In a potato picker, a vine conveyor adapted to receive potatoes, vines and other foliage from the discharge chute of a potato digger and embodying spaced slats through which the potatoes may be passed, a potato conveyor disposed beneath the vine conveyor and receiving the potatoes passing therethrough, cleaning apparatus disposed beneath the potato conveyor and embodying a bin into which the potato conveyor discharges, said cleaning apparatus embodying a conveyor of greater width than said potator conveyor and having the excess width thereof disposed at one side of the potato conveyor, a discharge chute disposed at the last named side of the cleaning apparatus, means embodied in the cleaning apparatus for moving the potatoes transversely thereof to said discharge chute, and a discharge conveyor receiving the potatoes from the discharge chute.

7. In a potato picker, a cleaning apparatus comprising an inclined conveyor provided upon its surface with inclined rows of abutment members, a potato bin disposed above the conveyor and having its lower edge spaced from the upper surface of the conveyor to permit passage of said abutment members, and means carried by the bin and yieldable to said abutment members for preventing the passage of potatoes between the lower edge of the bin and the conveyor comprising pivoted members carried by the lower end of the bin and having their lower ends disposed in proximity to the upper surface of the conveyor, said pivoted members being freely movable under engagement of the abutment members and being held against excessive return movement by their engagement with the bin.

8. In a potato picker, a cleaning apparatus comprising an inclined conveyor, inclined rows of abutment members carried by the conveyor, a discharge chute, a second conveyor to which the discharge chute discharges, a bin disposed above the first named conveyor and adapted to feed potatoes thereto for engagement by the abutment members and having its lower edge spaced from the upper surface of the conveyor to permit passage of the abutment members, means carried by the lower edge of the bin for preventing escape of potatoes between the conveyor and the lower edge of the bin, said means being yieldable under engagement by the abutment members, said abutment members engaging potatoes disposed within the bin and worming the same transversely of the first named conveyor to the discharge chute leading to the second named conveyor, and a second discharge chute into which the second named conveyor discharges.

9. In a potato picker, a cleaning apparatus comprising an inclined conveyor embodying spaced slats, an abutment member secured to each of said slats, and means for feeding the potatoes to the inclined conveyor, said abutment members being arranged in inclined rows and engaging the potatoes and worming the same to one side of the conveyor.

In testimony whereof we hereunto affix our signatures.

AUGUST F. ZABEL.
RALPH V. TOWNSEND.